May 30, 1933.  C. S. ABBOTT  1,911,335

STEERING MECHANISM FOR TRUCKS AND TRAILERS

Filed April 5, 1932    2 Sheets-Sheet 1

Inventor

Charles Stuart Abbott.

By A. J. O'Brien

Attorney

May 30, 1933.    C. S. ABBOTT    1,911,335
STEERING MECHANISM FOR TRUCKS AND TRAILERS
Filed April 5, 1932    2 Sheets-Sheet 2

Inventor
Charles Stuart Abbott.
By A. J. O'Brien
Attorney

Patented May 30, 1933

1,911,335

UNITED STATES PATENT OFFICE

CHARLES STUART ABBOTT, OF PALM SPRINGS, CALIFORNIA

STEERING MECHANISM FOR TRUCKS AND TRAILERS

Application filed April 5, 1932. Serial No. 603,356.

This invention relates to improvements in trailer trucks of the type employed on the highways and has reference more particularly to means for automatically steering the trailer while going around curves.

It is quite customary to move over our highways trucks provided with trailers for the purpose of transporting freight, some of these trucks are provided with four wheels at the rear and the usual two wheels at the front and are connected to a tractor truck which produces the power to move the load over the road. It is apparent that where the rear end of the truck or trailer is supported on four wheels, each secured to the end of an axle and where the axles can not be moved when the truck is turned, it becomes necessary to skid the wheels in going around turns.

In carrying heavy loads it is evident that a much stronger structure can be obtained if each end of the truck body is supported on a bogie truck having two parallel axles and four wheels, somewhat in the nature of a freight car. Where trucks for transporting goods are supported on eight wheels, four of which are secured to each bogie truck, the wheels are obliged to skid in turning corners as above intimated, and this makes the steering very difficult and is also very hard on the tires.

It is the object of this invention to produce a trailer in which the body is supported on two bogie trucks, each of which is pivotally connected to the body, one near the front and one near the rear end thereof. Each truck is provided with two parallel axles, whose ends are provided with spindle arms of the kind used in connection with the front wheels of automobiles and trucks of different kinds. A wheel is secured to each spindle arm and the two spindle arms on each axle are connected so that the wheels will turn simultaneously in the same direction and to the same angle. Means is provided for connecting the spindle arms on one axle with those on the other axle so that the pairs of wheels will turn simultaneously to the same extent, but in the opposite direction. Means is provided for turning the trucks about their pivotal connection with the body when a turn is to be made in the road and the two trucks are interconnected so as to turn simultaneously in opposite directions.

Having thus briefly described the construction, this will now be described in detail and for this purpose reference will be had to the accompanying drawings in which the preferred embodiment of the invention has been illustrated, and in which.

Figure 3:
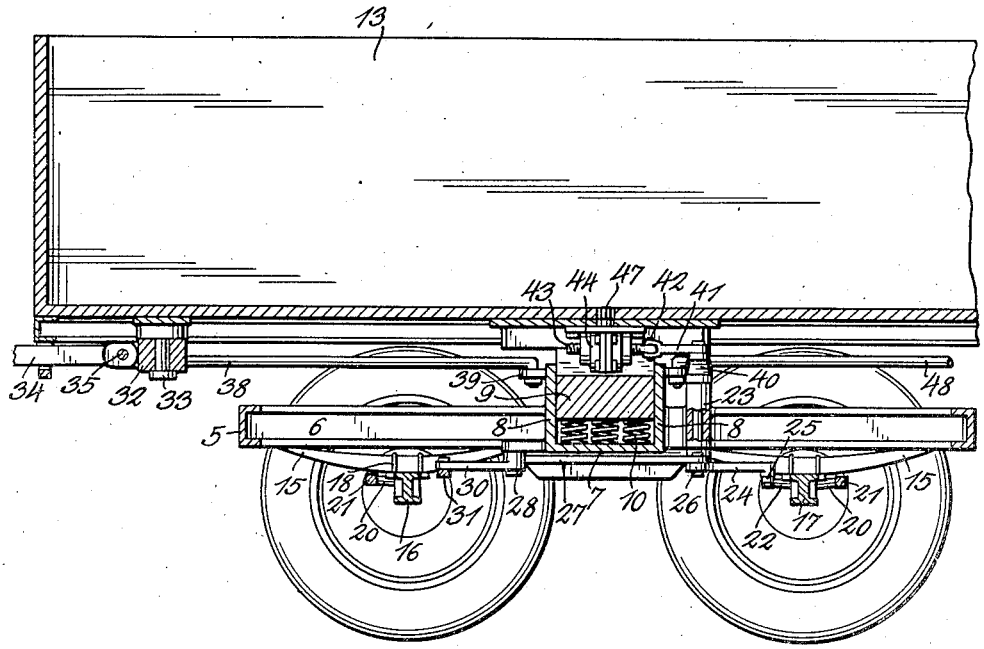
Fig. 3 is a section taken on line 3—3, Fig. 2.

The two bogie trucks employed for each trailer are duplicates and only one of them will be described in detail. Each of the trucks consists of a rectangular frame which has been indicated by reference numeral 5. The frame is preferably formed from channel irons as shown in Fig. 3 and may be electrowelded at the corners so as to form a substantially unitary piece. The two side members of the frame have been designated by reference numerals 6 and these are connected by means of a channel shaped bolster whose bottom has been designated by reference numeral 7 and the sides by reference numeral 8 in Fig. 3. Located within the bolster is a movable member 9 that rests on a number of springs 10. The member 9 has a central boss 11 from which a king pin 12 projects upwardly. The body of the trailer which has been designated by reference numeral 13 is supported on the boss 11 in a manner quite apparent but which has not been illustrated in detail, because only the usual practice is followed in this part of the construction.

The truck is provided with four pair of spring brackets 14 between each pair of which is a semi-elliptical spring 15. Secured to the springs are axles 16 and 17. These axles are attached to the springs in any approved manner as by means of U-bolts 18. Although the axles are identical in size and shape, they have been designated by different reference numerals because the axle 16 is the front axle of the truck and 17 the rear axle and by using different reference numerals, they can be readily distinguished from each other. The ends of the axles are provided with two spaced projections or fingers 19 between which is pivotally mounted a spindle arm. This spindle arm has not been shown by itself, but it is constructed in the usual manner and is provided with an arm 20 and the two arms 20 that are connected with the spindle arms on each axle are joined by a rod 21. The rod 21 connects the spindle arms in such a way that the two spindle arms and the wheels secured thereto move simultaneously in the same direction and to the same extent. One of the spindle arms on each axle is provided with an extra arm 22. The steering mechanism just described is the same as that employed on every truck and automobile and has only been described for the purpose of facilitating the remaining portions of the description. One side member 6 of the truck frame is provided with bearings 23 to the front of the axle 17 and journaled in this bearing is a bell crank lever having one arm 24 that is connected with the arm 22 by means of a link 25. The other arm of this lever has been designated by reference numeral 26 and this is connected by means of a link 27 with another bell crank lever that is pivoted at 28. The arm 29 of this last named bell crank lever is attached to the end of rod 27, while the arm 30 is connected by means of a link 31 with the arm 22 of the steering mechanism that is associated with the axle 16. It is now apparent that if either one of the wheels are turned about the pivotal connection of the spindle arm to which it is attached, that it will impart a corresponding movement to the other wheel on the same axle and a corresponding movement in the opposite direction to the wheels on the other axle.

It is evident that the steering mechanism must be connected with the body of the trailer in order to properly operate because the mechanism so far described is not controlled by any means that depends on the curvature of the road. For the purpose of controlling the steering mechanism, a lever 32 has been pivoted to the body so as to move about the pivot pin 33. A link 34 is connected with the lever 32 by means of a pin 35 and this is provided with an opening containing springs 36 that are connected with the drawbar 37. The ends of the lever 32 are connected by means of bars 38 with the lugs 39 at the ends of the vertical sides 8 of the bolster. Since the pivot pin 33 is connected with the body of the trailer and since the body is connected to the truck by means of the king bolt 12, it is evident that there can be no relative rotation of the truck about the king bolt 12 without a corresponding movement of the lever 32 about the pivot pin 33 and consequently whenever the lever 32 is turned about pin 33, it will cause a corresponding rotation of the truck about the king pin 12.

The bell crank lever having arms 24 and 26 is provided with a third arm that has been indicated by reference numeral 40 and secured to this arm is a link 41, one end of which is connected by means of a pin 42 with a threaded bar 43. The threaded bar extends through an opening in a casting 44 that is secured to the under surface of the body 13, as shown in Fig. 3. Located within the casting is a nut 45 that cooperates with the threaded bar 43 and which is provided with teeth that are engaged by means of a worm 46. This worm is held against longitudinal movement and has a square projection 47 that terminates in an opening in the bottom of the truck body so as to be accessible by means of a suitable socket wrench. It is apparent that by rotating the worm 46 and thereby rotating the nut 45, the bar 43 can be shifted so as to adjust the parts of the steering mechanism. Attention is directed at this point to the fact that the casting 44 is attached to the truck body and therefor the arm 40 is anchored to the truck body in such a way that unless the truck body moves relative to the truck the wheels will remain in a fixed position with respect to the axle.

Figure 2:
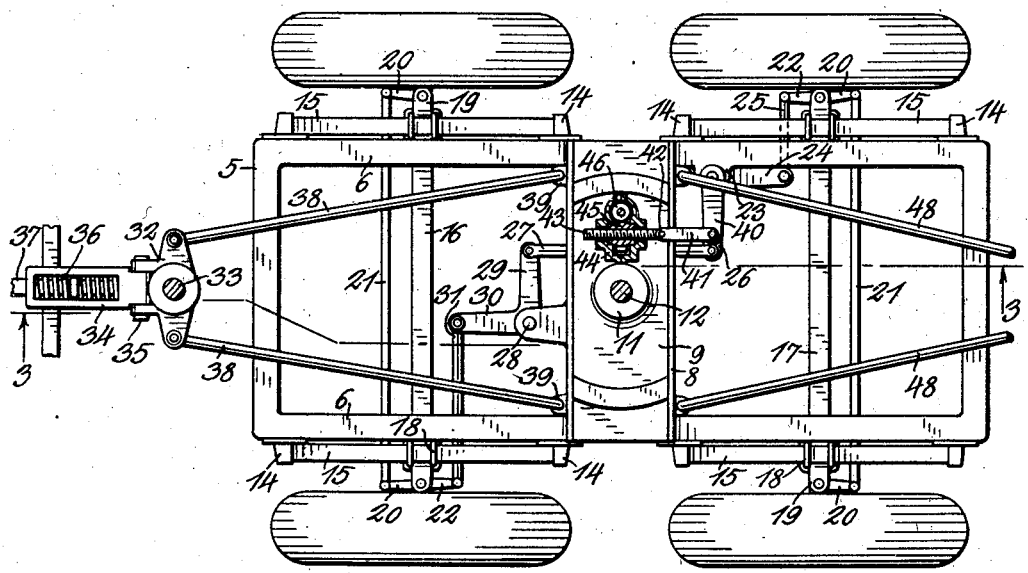
Fig. 2 is a top plan view of one of the trucks, portions being shown in section to better disclose the construction.

With the parts assembled in the manner above described, let us imagine that the lever 32 is turned about its pivot and through the action of the rods 38 this motion is transmitted to the truck frame which, thereupon, moves about the king pin 12. If this motion is in a counterclockwise direction, looking at Fig. 2, it will be apparent that since the casting 44 remains stationary with respect to the trailer body while the truck turns about the king pin, then the bearing 23 will move towards the left with respect to the casting and this will turn the lever 40 in a counterclockwise direction about its pivotal connection with the frame and this, in turn, will move the lever arms 24 and 26 in a counterclockwise direction, thereby turning the wheels that are attached to the axle 17 in a clockwise direction about the pivots of the spindle arms. The rod 27 will move in the direction of axle 17 thereby imparting to the two arms 29 and 30 of the bell crank lever that is pivoted at 28, a clockwise movement which is transmitted by the link 31 to the wheels on axle 16 which are thereby turned in counterclockwise direction through the same angle that the wheels connected with axle 17 were turned in a clockwise direction.

Figure 1:
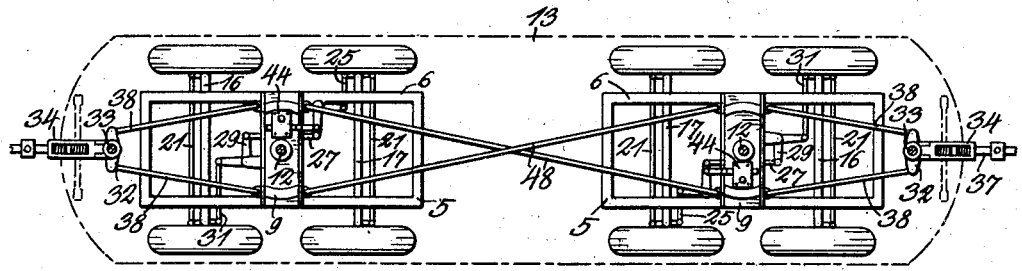
Fig. 1 is a top plan view of the two trucks on which the body is supported and shows the several interconnecting means.
Figure 4:
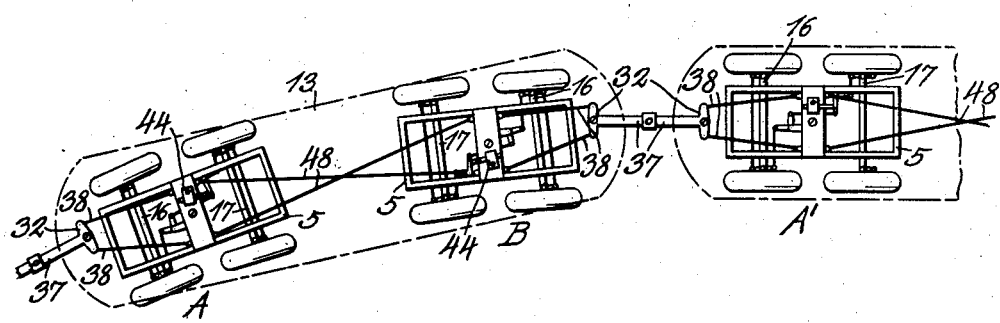
Fig. 4 is a top plan view showing a trailer made in accordance with this invention rounding a curve in the road.

A trailer is provided with two bogie trucks of the type described and these are connected to the body of the trailer by means of king bolts. The two trucks are identical in construction and are connected to the trailer body in the same way. It is evident, however, that the two trucks must be interconnected and this is accomplished by means of two rods 48. These rods are connected to the bolster of the forward truck and cross each other and have their other ends connected to the bolster of the rear truck in the manner shown in Fig. 1. It will be obvious from an inspection of Fig. 1 that when the forward truck is turned about the king pin that a corresponding movement will be imparted to the rear truck, but in the opposite direction. If we refer now to Fig. 4, the position of the parts during the turning a corner will be seen. In this diagram the forward truck has been indicated by A and the rear truck by B. The traction is produced by a force exerted on the drawbar 37 by a suitable tractor. When the parts are going about a corner, the movement of the lever 32 about its pivot is transmitted as above described through the rods 38 to the frame of the truck A and this movement is then transmitted through rods 48 to truck B. It is possible to have several trailers joined as indicated in Fig. 4, but for the purpose of this invention, the problem involved in transmitting the necessary steering movement from one trailer to the other will not be discussed, because the invention resides in the construction that has already been described, and which is all present in a single trailer unit.

I want to call particular attention to the fact that the steering mechanism is connected with the body of the trailer through the lever 32 and the housing 44 and that this is an important distinction as far as this invention is concerned.

Another important structural feature is that the axles of each truck are provided with spindle arms and that the steering mechanism produces simultaneous movement in the same direction and to the same extent of the two wheels on each axle and simultaneously therewith produce movement of the wheels in opposite directions on the two axles.

Another feature to which attention is called is the adjusting feature comprising the housing 44 with the rotatable nut 45 located therein.

In the above description the invention has been described in connection with trailers but it is equally well adapted for power operated trucks such as used in freight and passenger traffic and in such cases the steering is effected through the worm 46 which can be connected with a steering wheel suitably located. By rotating the worm the wheels can be controlled as with any ordinary steering mechanism and this makes it possible to mount the bodies of passenger trucks on two bogie trucks and interconnect them in the manner shown and described.

When one of the devices illustrated is used as a tractor, it can be employed for pulling a train of trailers as described above.

The use of this steering mechanism for passenger trucks and for single freight trucks makes it possible to employ eight wheels and to get easier riding qualities in a manner well understood.

Having described the invention what is claimed as new is:

1. A trailer comprising, in combination, a substantially rectangular truck frame, two spaced parallel axles attached to the same, a spindle arm pivoted to each of the two ends of each axle, a wheel carried by each spindle arm, means for interconnecting the spindle arms of each axle so that the pair of wheels on each axle will always remain parallel and move simultaneously, means for interconnecting the pair of wheels on one axle with the pair on the other axle so that the two pair of wheels will move simultaneously through the same angles, but in opposite directions, a bolster extending transversely of the truck frame about midway between the axles, a truck body pivotally supported by the bolster, the end of the body extending to a point forward of the frame, a lever having its rear end pivotally connected to the under side of the body in front of the front truck, rods extending from the ends of the lever to the ends of the bolster whereby when the lever is turned about its pivot it will turn the truck about its pivotal connection with the body and means for anchoring one point of the steering mechanism to the body whereby when the truck is moved with respect to the body, it will operate the steering mechanism.

2. A trailer comprising, in combination, a substantially rectangular truck frame, two spaced parallel axles attached to the same, a spindle arm pivoted to each of the two ends of each axle, a wheel carried by each spindle arm, means for interconnecting the spindle arms of each axle so that the pair of wheels on each axle will always remain parallel and move simultaneously, means for interconnecting the pair of wheels on one axle with the pair on the other axle so that the two pair of wheels will move simultaneously through the same angles but in opposite directions, a bolster extending transversely of the truck frame about midway between the axles, a truck body pivotally supported by the bolster, the end of the body extending to a point forward of the frame, a lever having its rear end pivotally connected to the under side of the body in front of the front truck, rods extending from the ends of the lever to the ends of the bolster whereby when the lever is turned about its pivot it will turn the truck about its pivotal connection with the body, means for anchoring one point of the steering mechanism to the body whereby when the truck is moved with respect to the body it will operate the steering mechanism and means for effecting adjustment of the steering mechanism with respect to the truck body.

3. A trailer comprising an elongated body, a bogie truck frame under each end of the body, there being a pivotal connection between each truck and the body, each truck frame having a transverse bolster on which the body is supported, each truck having two spaced transversely extending axles, a wheel secured to each axle and mounted for movement with respect to the axle about a substantially vertical pivot, means for interconnecting the wheels on each axle so that they will move about the vertical pivots simultaneously to the same extent and in the same direction, means interconnecting the wheels on one axle with those on the other whereby when the wheels on one axle are moved in one direction about the vertical pivots they will impart a corresponding movement to the wheels on the other axle, but in the opposite direction, means for adjustably connecting one part of the steering mechanism with the truck body whereby a relative movement between the truck and the body will effect a movement of the truck wheels and means interconnecting the two trucks whereby when one is moved relative to the body it will effect a corresponding movement, in a reverse direction, between the other truck and the body.

4. A trailer comprising an elongated body, a bogie truck frame under each end of the body, there being a pivotal connection between each truck and the body, each truck frame having a transverse bolster on which the body is supported, each truck having two spaced transversely extending axles, a wheel secured to each axle and mounted for movement with respect to the axle about a substantially vertical pivot, means for interconnecting the wheels on each axle so that they will move about the vertical pivots simultaneously to the same extent and in the same direction, means interconnecting the wheels on one axle with those on the other whereby when the wheels on one axle are moved in one direction about the vertical pivots they will impart a corresponding movement to the wheels on the other axle, but in the opposite direction, means for adjustably connecting one part of the steering mechanism with the truck body whereby a relative movement between the truck and the body will effect a movement of the truck wheels, means interconnecting the two trucks whereby when one is moved relative to the body it will effect a corresponding movement, in a reverse direction, between the other truck and the body, and means pivotally attached to the truck body and connected with one of the trucks for turning the truck with respect to the body.

5. A trailer comprising an elongated body, a bogie truck frame under each end of the body, there being a pivotal connection between each truck and the body, each truck frame having a transverse bolster on which the body is supported, each truck having two spaced transversely extending axles, a wheel secured to each axle and mounted for movement with respect to the axle about a substantially vertical pivot, means for interconnecting the wheels on each axle so that they will move about the vertical pivots simultaneously to the same extent and in the same direction, means interconnecting the wheels on one axle with those on the other whereby when the wheels on one axle are moved in one direction about the vertical pivots they will impart a corresponding movement to the wheels on the other axle, but in the opposite direction, means for adjustably connecting one part of the steering mechanism with the truck body whereby a relative movement between the truck and the body will effect a movement of the truck wheels, means interconnecting the two trucks whereby when one is moved relative to the body it will effect a corresponding movement, in a reverse direction, between the other truck and the body, and means pivotally attached to the truck body and connected with one of the trucks for turning the truck with respect to the body, said last named means comprising a lever pivoted to the body and having its ends connected with the sides of the truck.

In testimony whereof I affix my signature.

CHARLES STUART ABBOTT.